US009766946B2

(12) United States Patent
Mackerras

(10) Patent No.: US 9,766,946 B2
(45) Date of Patent: Sep. 19, 2017

(54) SELECTING PROCESSOR MICRO-THREADING MODE

(71) Applicant: International Business Machines Corporation, Armonk, NY (US)

(72) Inventor: Paul Mackerras, Weston (AU)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 14/938,011

(22) Filed: Nov. 11, 2015

(65) Prior Publication Data
US 2017/0132049 A1 May 11, 2017

(51) Int. Cl.
*G06F 9/50* (2006.01)
*G06F 9/455* (2006.01)
*G06F 9/22* (2006.01)

(52) U.S. Cl.
CPC ............ *G06F 9/5077* (2013.01); *G06F 9/223* (2013.01); *G06F 9/45558* (2013.01); *G06F 9/5083* (2013.01); *G06F 2009/4557* (2013.01)

(58) Field of Classification Search
None
See application file for complete search history.

(56) References Cited

U.S. PATENT DOCUMENTS

| 2003/0014612 | A1 | 1/2003 | Joy et al. | |
|---|---|---|---|---|
| 2006/0064695 | A1* | 3/2006 | Burns | G06F 9/3851 718/100 |
| 2008/0104296 | A1* | 5/2008 | Blackmore | G06F 9/4812 710/267 |
| 2012/0174114 | A1* | 7/2012 | Matsumoto | G06F 11/3423 718/104 |
| 2012/0246447 | A1* | 9/2012 | Bishop | G06F 9/30101 712/214 |
| 2013/0311812 | A1* | 11/2013 | Bose | G06F 9/50 713/340 |

(Continued)

FOREIGN PATENT DOCUMENTS

EP 2363861 9/2011

OTHER PUBLICATIONS

MacKerras, Paul, "[Patch 1/2] KVM: PPC: Book3S HV: Make use of unused threads when running guests," Patch 1/2 to Linux v4.1-rc2, May 2015, 8 pages. Note—this is a Grace Period Disclosure by the inventor.

(Continued)

*Primary Examiner* — Kenneth Tang
(74) *Attorney, Agent, or Firm* — VanLeeuwen & VanLeeuwen; Steven L. Bennett

(57) ABSTRACT

An approach is provided to dynamically select a micro-threading (MT) mode of each core of a processor based on a load on each of the respective cores while the processor is running a hypervisor. The approach sets a core's micro-threading mode to a whole-core mode (MT1) in response to identifying that the load on the selected core is at a light load level, sets the core's micro-threading mode to a two-way micro-threading mode (MT2) in response to identifying that the load on the selected core has increased above the light load level, and sets the selected core's micro-threading mode to a four-way micro-threading mode (MT4) in response to identifying that the load on the selected core is at a high load level.

11 Claims, 10 Drawing Sheets

(56) References Cited

U.S. PATENT DOCUMENTS

2014/0344546 A1   11/2014   Ware et al.

OTHER PUBLICATIONS

MacKerras, Paul, "[Patch 2/2] KVM: PPC: Book3S HV: Implement dynamic microthreading on POWER8," Patch 2/2 to Linux v4.1-rc2, May 2015, 9 pages. Note—this is a Grace Period Disclosure by the inventor.

MacKerras, Paul, "[Patch v2] KVM: PPC: Book3S HV: Implement dynamic microthreading on POWER8," Patch v2 to Linux v4.1-rc2, Jun. 2015, 10 pages. Note—this is a Grace Period Disclosure by the inventor.

MacKerras, Paul, "[Patch 1/5] KVM: PPC: Book3S HV: Make use of unused threads when running guests," Patch 1/5 to Linux v4.1-rc2, Jun. 2015, 8 pages. Note—this is a Grace Period Disclosure by the inventor.

MacKerras, Paul, "[Patch 2/5] KVM: PPC: Book3S HV: Implement dynamic microthreading on POWER8," Patch 2/5 to Linux v4.1-rc2, Jun. 2015, 10 pages. Note—this is a Grace Period Disclosure by the inventor.

MacKerras, Paul, "[Patch v2 2/5] KVM: PPC: Book3S HV: Implement dynamic microthreading on POWER8," Patch v2 2/5 to Linux v4.1-rc2, Jun. 2015, 10 pages. Note—this is a Grace Period Disclosure by the inventor.

MacKerras, Paul, "[Patch v3] KVM: PPC: Book3S HV: Implement dynamic microthreading on POWER8," Patch v3 to Linux v4.1-rc2, Jul. 2015, 10 pages. Note—this is a Grace Period Disclosure by the inventor.

MacKerras, Paul, "[Patch 1/2] KVM: PPC: Book3S HV: Fix preempted vcore list locking," Patch 1/2 to Linux v4.1-rc2, Jul. 2015, 1 page. Note—this is a Grace Period Disclosure by the inventor.

MacKerras, Paul, "[Patch] KVM: PPC: Book3S HV: Fix handling of interrupted VCPUs," Patch to Linux v4.1-rc2, Sep. 2015, 1 page. Note—this is a Grace Period Disclosure by the inventor.

MacKerras, Paul, "Selecting Processor Micro-Threading Mode," U.S. Appl. No. 14/948,277, filed Nov. 21, 2015, 43 pages.

"List of IBM Patents or Patent Applications Treated as Related," Letter from Leslie A. Van Leeuwen, Nov. 21, 2015, 1 page.

\* cited by examiner

SELECTING PROCESSOR MICRO-THREADING MODE

STATEMENT REGARDING PRIOR DISCLOSURES BY THE INVENTOR

At least nine disclosures that would otherwise qualify as prior art under AIA 35 U.S.C. 102(a)(1) are disqualified as prior art in that each of these disclosures was made (1) one year or less before the effective filing date of the claimed invention; and (2) by an inventor or co-inventor. These disclosures are listed in the Information Disclosure Statement (IDS) filed on the same day as the present application and cited as items 1-9 in the Non-Patent Literature (NPL) section of documents. Item 1 is cited as MACKERRAS, PAUL, "[PATCH 1/2] KVM: PPC: Book3S HV: Make use of unused threads when running guests," Patch 1/2 to Linux v4.1-rc2, May 2015, 8 pages. Item 2 is cited as MACKERRAS, PAUL, "[PATCH 2/2] KVM: PPC: Book3S HV: Implement dynamic microthreading on POWER8," Patch 2/2 to Linux v4.1-rc2, May 2015, 9 pages. Item 3 is cited as MACKERRAS, PAUL, "[PATCH v2] KVM: PPC: Book3S HV: Implement dynamic microthreading on POWER8," Patch v2 to Linux v4.1-rc2, June 2015, 10 pages. Item 4 is cited as MACKERRAS, PAUL, "[PATCH 1/5] KVM: PPC: Book3S HV: Make use of unused threads when running guests," Patch 1/5 to Linux v4.1-rc2, June 2015, 8 pages. Item 5 is cited as MACKERRAS, PAUL, "[PATCH 2/5] KVM: PPC: Book3S HV: Implement dynamic microthreading on POWER8," Patch 2/5 to Linux v4.1-rc2, June 2015, 10 pages. Item 6 is cited as MACKERRAS, PAUL, "[PATCH v2 2/5] KVM: PPC: Book3S HV: Implement dynamic microthreading on POWER8," Patch v2 2/5 to Linux v4.1-rc2, June 2015, 10 pages. Item 7 is cited as MACKERRAS, PAUL, "[PATCH v3] KVM: PPC: Book3S HV: Implement dynamic microthreading on POWER8," Patch v3 to Linux v4.1-rc2, July 2015, 10 pages. Item 8 is cited as MACKERRAS, PAUL, "[PATCH 1/2] KVM: PPC: Book3S HV: Fix preempted vcore list locking," Patch 1/2 to Linux v4.1-rc2, July 2015, 1 page. Item 9 is cited as MACKERRAS, PAUL, "[PATCH] KVM: PPC: Book3S HV: Fix handling of interrupted VCPUs," Patch to Linux v4.1-rc2, September 2015, 1 page.

BACKGROUND OF THE INVENTION

Technical Field

This disclosure relates to dynamically selecting a micro-threading mode of a processor based on system usage.

Description of Related Art

This disclosure relates to the issue of choosing a micro-threading mode of certain processors, such as the POWER8™ processor designed by International Business Machines Corporation. The micro-threading mode is used with certain applications, such as the PowerKVM™ virtualization product. IBM's POWER8 processor core has three modes available to be selected by hypervisor software, which affect how many distinct logical partitions also known as virtual machines, or guests) can run concurrently on the core and what simultaneous multi-threading (SMT) modes can be utilized by those logical partitions.

The POWER8 core has the capability of running up to 8 threads of execution. The three modes are: (1) whole-core mode (MT1), (2) two-way micro-threading mode (MT2), and (3). In whole-core mode (MT1) only one logical partition can run on the core, and that logical partition can run in single-thread (ST) mode, two threads/core mode (SMT2), four threads/core mode (SMT4), or eight threads/core mode (SMT8), at its discretion. All eight threads, 0-7, are available to the single logical partition running on the core. The core reconfigures its resources automatically according to how many threads are running, which means that a thread will execute faster in ST mode than in SMT8 mode (though the aggregate performance of 8 threads in SMT8 mode is usually greater than the performance of one thread in ST mode).

In two-way micro-threading mode (MT2), two distinct logical partitions can run simultaneously, one using threads 0-3 and the other using threads 4-7, that is, the core is split into two subcores. Internally, the core is always in SMT8 mode, which has the consequence that even if only one thread is active and the others are all idle, the performance of that thread is lower than in single-thread (ST) mode. ST mode is only available when the processor core is in whole-core mode.

In four-way micro-threading mode (MT4), four distinct logical partitions can run simultaneously, using threads 0-1, 2-3, 4-5 and 6-7 respectively, that is, the core is split into four subcores. Internally, the core is always in SMT8 mode, as for two-way micro-threading mode.

Kernel Virtual Machine (KVM) for POWER™, also known as PowerKVM™, is a Linux®-based hypervisor for IBM POWER8™ machines. It utilizes a Linux® kernel running as the host operating system (OS). The Linux kernel runs in the processor's hypervisor mode and has access to all the facilities of the machine. It supports guest logical partitions through the facilities provided by the KVM module, which is a component of the Linux kernel. It provides a full OS environment, with a process scheduler, virtual memory management, file systems, network stacks, and device drivers, and supports execution of processes in user space.

PowerKVM includes two components which run as userspace processes: QEMU and libvirtd. To initiate a new guest logical partition, a file describing the characteristics of the new guest partition in XML format is created. This file contains details of the number of virtual CPUs, amount of memory, and virtual and real I/O devices to be assigned to the guest partition. A new guest is started by issuing a command to libvirtd specifying the guest XML file. Libvirtd then starts a QEMU process, which uses the facilities of the KVM module to create the guest and start it executing.

One of the details provided in the guest XML file is the virtual SMT mode for the guest partition, that is, the number of guest virtual CPUs (vCPUs) in each virtual core (vcore). The virtual SMT (vSMT) mode can be specified to be 1, 2, 4 or 8, or left unspecified, in which case it is taken to be 1. The KVM module gives effect to the virtual SMT mode by ensuring that vCPUs in the same vcore always run together on a physical core when they are executing in the guest. Existing releases of PowerKVM support a single system-wide selection of micro-threading mode. The selected mode applies to all processor cores and can be changed only when no guests are running.

Linux® is the registered trademark of Linus Torvalds in the U.S. and other countries.

SUMMARY

An approach is provided to dynamically select a micro-threading (MT) mode of each core of a processor based on a load on each of the respective cores while the processor is running a hypervisor. The approach sets a core's micro-threading mode to a whole-core mode (MT1) in response to identifying that the load on the selected core is at a light load level, sets the core's micro-threading mode to a two-way micro-threading mode (MT2) in response to identifying that the load on the selected core has increased above the light load level, and sets the selected core's micro-threading mode to a four-way micro-threading mode (MT4) in response to identifying that the load on the selected core is at a high load level.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1A:
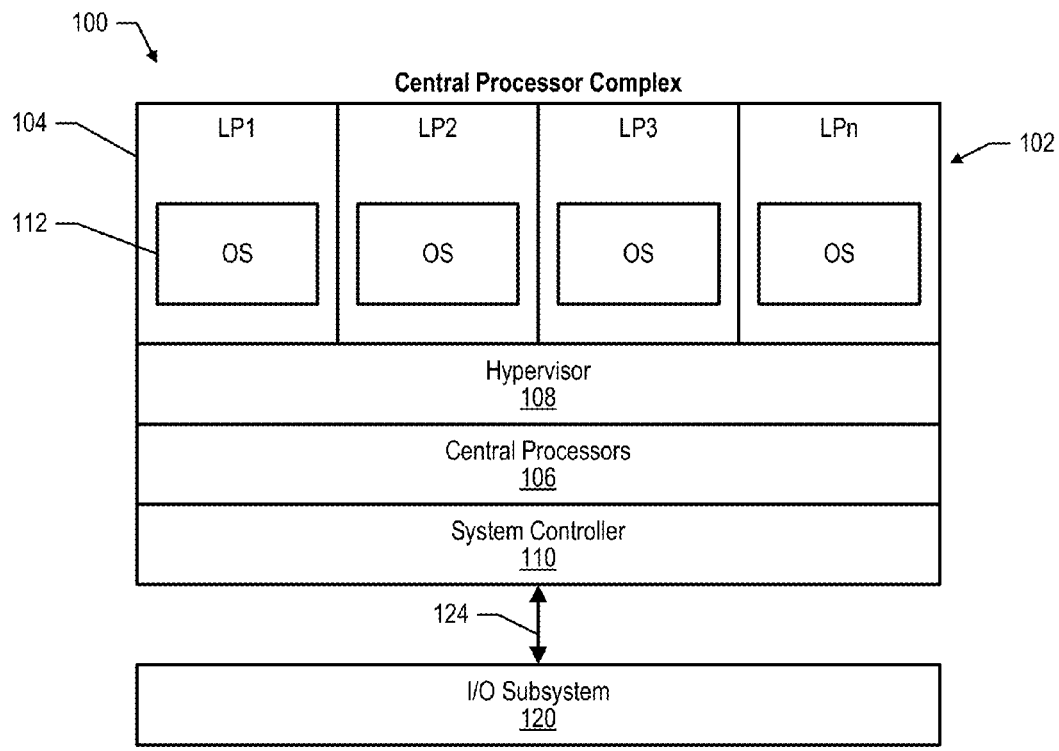
FIG. 1A depicts one embodiment of a computing environment to incorporate and use one or more aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIGS. 1-10 show an approach for dynamically selecting a processor micro-threading (MT) mode. The approach described herein provides a way for a hypervisor running on a POWER8™ or similar system to select the appropriate micro-threading mode for each processor core dynamically, based on load and the configuration of partitions being run. This approach strives to maximize performance when the system is lightly loaded, and to maximize throughput when the system is heavily loaded.

In this approach, the system chooses the MT mode for each core independently and dynamically according to the load on the system. When lightly loaded, the processor cores will be in MT1 mode. As the load increases and the opportunity arises, the system will automatically switch individual cores into MT2 or MT4 mode on entry to the guest, and then when exiting from the guest to the host, those cores will be switched back to MT1 mode.

Dynamically choosing the MT mode strives to provide better performance across a range of workloads. In addition, the automatic nature of the approach frees the system administrator from having to choose an MT mode, and mitigates the impact of naive configurations that do not choose a virtual simultaneous multi-threading (vSMT) mode.

Because of the fact that only one logical partition can execute on each subcore, the host kernel is run in single-thread (ST) mode. As the host kernel uses the memory management unit (MMU), it occupies one logical partition for itself. Running the host kernel in ST mode means that when a task wishes to enter the guest, it can do so immediately because all of the other threads in the subcore are idle. If the other threads were active, it would be necessary to interrupt them and get them to switch their context to the guest, which would add latency to the guest entry path.

In PowerKVM™, the Linux® scheduler allocates the CPUs to runnable tasks, and moves tasks between CPUs so as to balance the load, subject to constraints on task placement expressed by each task's CPU affinity map. This applies to tasks associated with vCPUs as well as other tasks.

When a vCPU task that wishes to execute in guest context gets scheduled by the scheduler, it first accesses a data structure associated with the vcore that contains this vCPU. A field in that vcore data structure indicates whether or not some other vCPU task belonging to that vcore has taken the responsibility to run the vcore in the guest. If so, that vCPU task is called the "runner" for the vcore, and in that case the current vCPU task sleeps waiting for the runner to notify it that the current vCPU has finished executing in the guest and now needs some action taken by the host. If there is currently no runner, the current vCPU task takes on the responsibility of being the runner and proceeds to switch to the guest context.

An exemplary implementation of the approach described above is as follows. Before switching into the guest context, the runner first checks with the scheduler to see whether the scheduler wishes to reassign the CPU to another task. If it does, then the runner places the vcore data structure onto a per-CPU list and then yields the CPU to the scheduler. When the runner gets to run again, some time later, it removes the vcore data structure from the list it was put onto. In this way the system maintains a list for each CPU of the vcores that are ready to run but have been preempted by the scheduler (the "preempted vcores list"). (Using a per-CPU list rather than a single global list improves scalability.)

On the other hand, if the scheduler does not wish to run another task, then the runner task can proceed to enter guest context and run its vcore. This vcore is referred to as the "primary" vcore. If the primary vcore does not occupy the whole of the physical core, then before it enters guest context, the runner task scans the preempted vcores list to see if there are any other vcores that could be run alongside the primary vcore to use up spare capacity in the physical core. These additional vcores are called "secondary" vcores. The runner task constructs a list containing the primary vcore and the secondary vcores (if any), switches the core to MT2 or MT4 mode if required, and then enters guest context.

At some point in the future, one or more vCPUs will reach the point where they need to switch back to host context, either because of an interrupt that needs to be handled by the host, or because the guest vCPU requires some service from the host. At this point, all of the vCPUs currently executing on the core are interrupted in order to cause them to exit from the guest also. When all vCPUs have exited the guest, the runner task then switches the core back to MT1 mode if it is in MT2 or MT4 mode.

Thus the process followed by the runner task is as follows: (1) Check if the scheduler wishes to preempt the current task; if so go to step P1 below; (2) Scan the preempted vcores list and select secondary vcores to be run along with the primary vcore. The selection is done according to the algorithm described below; (3) Switch the core to MT2 or MT4 mode if required; (4) Signal the secondary hardware threads of the core to wake up and begin execution of their assigned vCPUs; (5) Enter guest context on hardware thread 0; (6) On exit from guest context, switch the core to MT1 mode if it is not already in MT1 mode; (7) Perform post-execution processing for all the vCPUs that executed on the core; (8) If the runner's vCPU does not require service from the host, return to step 1 above; (9) If there are other vCPUs in this vcore that are ready to execute in the guest, select one and wake it up to become the runner; and (10) Perform the necessary service in the host and then return to step 1.

Preemption related tasks (Px), when needed, are performed as follows: (P1) Place the current vcore on the preempted vcores list for the current CPU; (P2) Yield the CPU to the scheduler; (P3) Remove the vcore from the preempted vcores list that it was placed onto; and (P4) Return to step 1 above.

The algorithm for selecting secondary vcores is controlled by two parameters: (1) target_smt_mode: this controls the total number of vCPU threads that the algorithm tries to get onto the core; and (2) dynamic_mt_modes: this controls which of MT2 and/or MT4 the algorithm will consider using (MT1 is assumed to be always allowed). In one embodiment, the target_smt_mode parameter is normally set to 8 and the dynamic_mt_modes parameter is normally set to 6 (meaning both MT2 and MT4 are allowed).

The algorithm also maintains several variables that include: (a) number_of_subcores: how many subcores will be needed for the primary vcore and any secondary vcores accepted so far; (b) max_subcore_threads: the maximum number of hardware threads used in any subcore; (c) total_threads: the total number of hardware threads used in all subcores; (d) subcore_threads: an array containing the number of hardware threads used in each subcore. In addition, the algorithm maintains a list of vcores per subcore and a pointer to the per-partition data for each subcore. Finally, the algorithm maintains a selected_MT_mode which is a variable that contains the MT mode that has been dynamically selected by the algorithm.

For each vcore, the algorithm considers the total number of vCPUs associated with the vcore (i.e., the vSMT mode of the associated guest partition), not the number of vCPUs that are currently ready to run in the guest. The reason for this is that it means a vCPU that becomes ready to run when its vcore is running on a core will always have a hardware thread on that core free to run it. The algorithm initializes the variables to indicate one subcore containing the primary vcore. It then iterates through the preempted vcores list, and for each one in turn, determines if it can be accepted. If it can be accepted, the variables are updated to reflect the addition of the vcore. The algorithm terminates when the end of the list is reached or when the total_threads variable equals or exceeds target_smt_mode. To determine if a secondary vcore can be accepted, the algorithm considers the following. In the following, new_threads denotes the number of threads associated with the secondary vcore being considered.

The secondary subcore acceptability algorithm is as follows (1) If total_threads+new_threads>target_smt_mode, the secondary vcore is not accepted; (2) If new_threads=1 and there is a subcore that already contains one or more vcores from the same guest partition, it may be possible to add this vcore to the subcore and thus accept it. It is possible if subcore_threads[this_subcore]+1 is not greater than the number of threads per subcore for the MT mode implied by number_of_subcores and the permitted MT modes. If so, the vcore is accepted, otherwise proceed to the next step. This only applies to guest partitions in vSMT mode 1 because partitions in other vSMT modes use POWER ISA features that depend on the specific physical thread that a vCPU is dispatched on; (3) At this stage it would be necessary to add another subcore for the vcore to be accepted. It is possible to add another subcore if MT4 mode is permitted and number_of_subcores<=3, or if MT2 mode is permitted and number_of_subcores=1, and if both max_subcore_threads and new_threads are not greater than the number of threads per subcore for the MT mode implied by number_of_subcores+1 and the permitted MT modes. If these are satisfied, a new subcore is added containing just the secondary vcore being considered, and the vcore is accepted; (4) If MT4 mode is permitted and there is an existing subcore containing between 3 and 6 vcores from a guest partition in vSMT mode 1 (and thus between 3 and 6 threads), it may be possible to add another subcore if the existing subcore were split into 2 or 3 subcores containing at most 2 vcores each. In this situation the algorithm considers whether the conditions in step 3 would be satisfied if the split were done, and if so, it does the split and accepts the vcore; and (5) Otherwise the vcore can not be accepted.

The following detailed description will generally follow the summary of the invention, as set forth above, further explaining and expanding the definitions of the various aspects and embodiments of the invention as necessary. To this end, this detailed description first sets forth a computing environment in FIGS. 1A and 1B that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
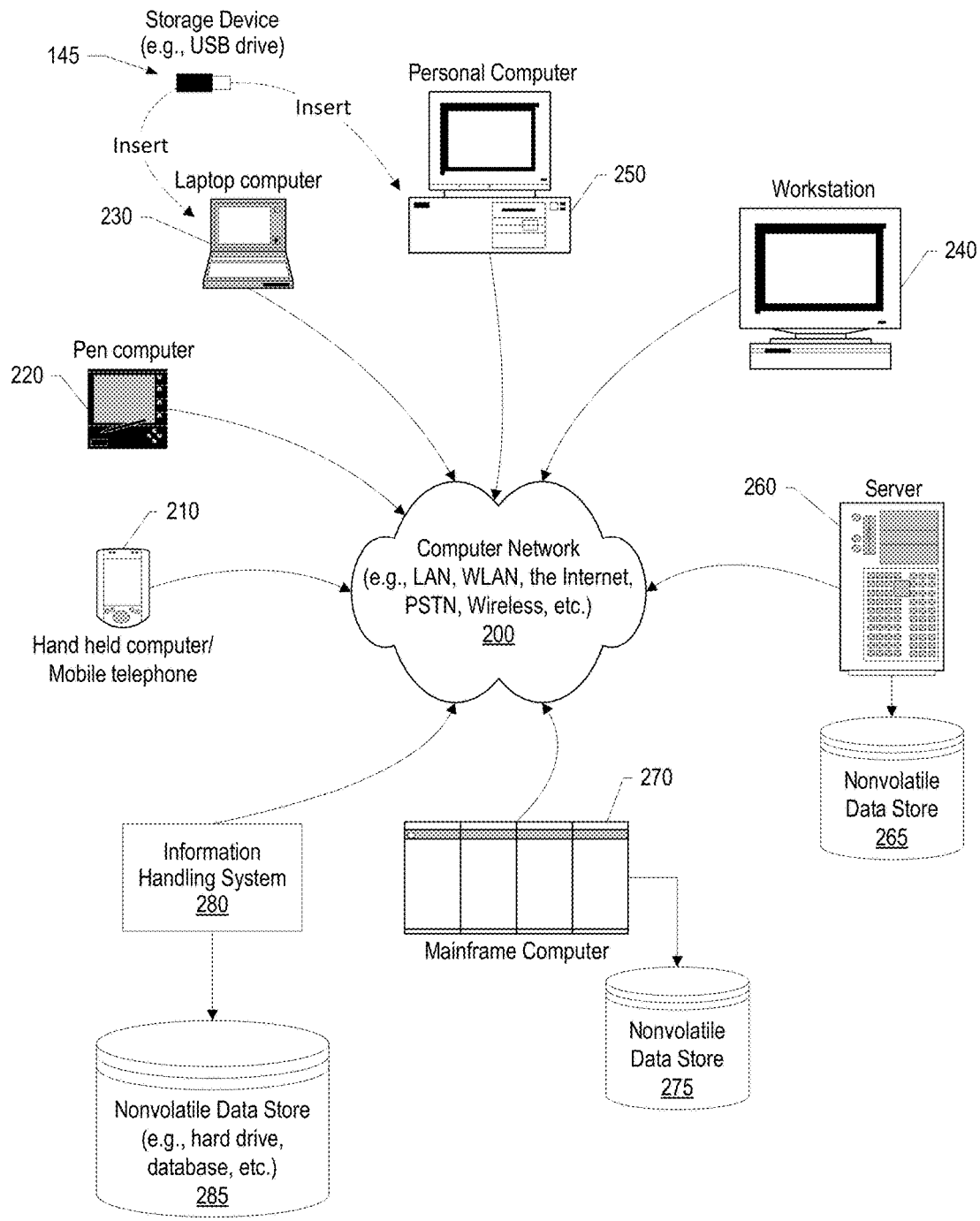
FIG. 2 is a network environment that includes various types of information handling systems interconnected via a computer network.

FIG. 1A depicts one embodiment of a computing environment to incorporate and use one or more aspects of the present invention. As one example, computing environment 100 includes a central processor complex (CPC) 102 coupled to an input/output (I/O) subsystem 120. Central processor complex 102 includes, for instance, one or more partitions 104 (e.g., logical partitions LP1-LPn), one or more central processors 106, a hypervisor 108 (e.g., a logical partition manager), and a system controller 110, each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time-sliced manner.

As used herein, firmware includes, e.g., the microcode, millicode, and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In this particular example, each logical partition has a resident operating system 112, which may differ for one or more logical partitions. In one embodiment, operating system 112 is the Linux® operating system. Further, in this example, each logical partition has assigned thereto a portion of system main storage (memory), which is referred to as a zone. Linux® is the registered trademark of Linus Torvalds in the U.S. and other countries.

A logical partition 104 includes one or more logical processors. Each logical processor may have a central processor 106 permanently allocated thereto, or there may be a pool of central processors 106 available for dynamic allocation to any group of logical processors, possibly spanning multiple logical partitions 104.

Logical partitions 104 are managed by hypervisor 108 implemented, for instance, by firmware running on processors 106. Logical partitions 104 and hypervisor 108 each comprise one or more programs residing in respective portions of main storage associated with the central processor. One example of hypervisor 108 is the PowerKVM™, offered by International Business Machines Corporation, Armonk, N.Y.

Central processors 106 are coupled to, but separate from, system controller 110. System controller 110 is, for instance, a hardware component that controls access to memory and caches within the central processors, and communicates between the central processors and input/output subsystem 120. The system controller is responsible for the queuing, serialization, and execution of requests made by the central processors and the I/O subsystem. In one example, it is responsible for sending commands to particular central processors and/or broadcasting commands to multiple central processors. The system controller may be a centralized component or its functions may be distributed. The system controller is not a processor or core; for example, it does not execute user applications. Instead, it is the communications mechanism between the I/O subsystem and the central processors.

Further details regarding central processors 106 are described with reference to FIG. 1B. In one example, a central processor 106 includes one or more cores or processors 150, which are the physical processors that are allocated to one or more logical partitions. A central processor is considered part of a node, and each node includes one or more central processors. A logical partition can span nodes in which one or more central processors from one node and one or more central processors from another node can be assigned to the logical partition.

Further, in accordance with an aspect of the present invention, central processor 106 includes a controller 160 (e.g., hardware controller) used to perform re-characterization to adjust the parameters of a processor, which may be inactive or active. An inactive processor is a processor that is not currently accepting workload to be executed. It may be a processor which was performing at an unacceptable level, and therefore, its workload was moved to another processor, but it is still powered up; or it may be a spare processor waiting to be activated. An active processor is a processor that is ready to receive and execute workload and/or is executing workload.

Figure 1B:
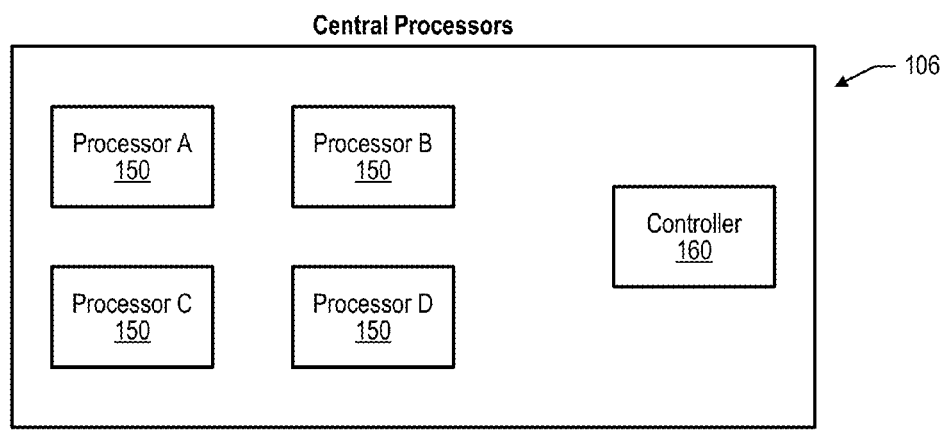
FIG. 1B depicts further details of the central processors of FIG. 1A, in accordance with an aspect of the present invention.

While FIGS. 1A and 1B shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIG. 2 provides an extension of the information handling system environment shown in FIGS. 1A and 1B to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
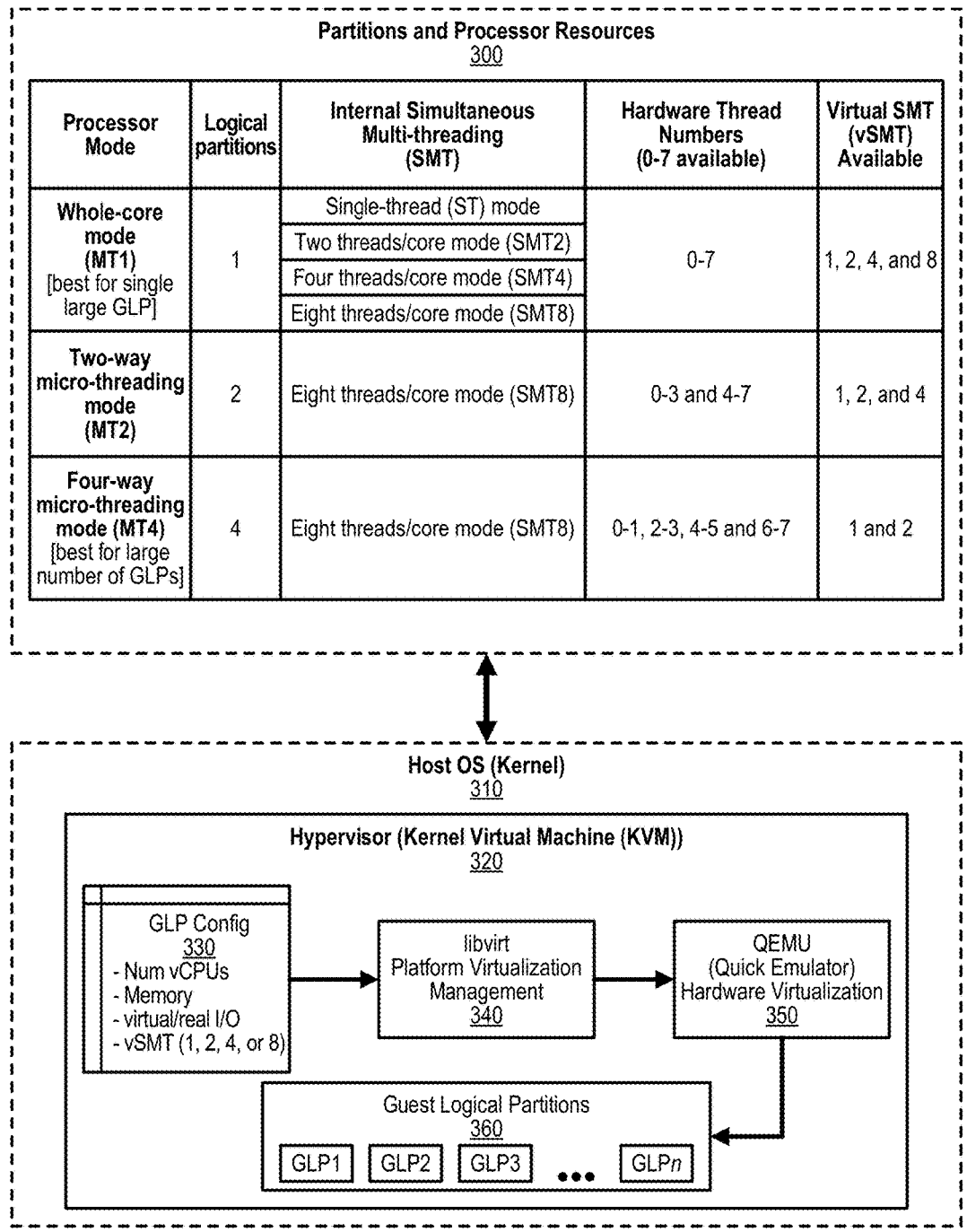
FIG. 3 is a diagram depicting partitions and processor resources available to a host operating system and hypervisor.

FIG. 3 is a diagram depicting partitions and processor resources available to a host operating system and hypervisor. Table 300 depicts various partitions and processor resources that can be dynamically set based upon system load. In one embodiment, three different processor modes are available. These modes include whole core mode (MT1) which is generally the best mode to use for a single large guest logical partition (GLP), two-way micro-threading mode (MT2), and four-way micro-threading mode (MT4). While in whole-core mode, the number of logical partitions available is one. Four different internal simultaneous multi-threading (SMT) modes are available while using whole-core mode. These SMT modes include single-thread (ST) mode, two threads per core mode (SMT2), four threads per core mode (SMT4), and eight threads per core mode (SMT8). There are eight hardware threads available, numbered 0-7, and in whole-core mode any and all of the hardware thread numbers are available. Finally, the virtual simultaneous multi-threading (vSMT) modes that are available while in whole-core mode are vSMT modes 1, 2, 4, and 8.

While in two-way micro-threading mode (MT2), the number of logical partitions available is two. The SMT mode that is available in MT2 is SMT8. The hardware thread numbers that are available are 0-3 to one of the logical partitions, and 4-7 to the other logical partition. The virtual simultaneous multi-threading (vSMT) modes that are available while in two-way micro-threading mode are vSMT modes 1, 2, and 4. Finally, in four-way micro-threading mode (MT4), the number of logical partitions available is four and the SMT mode that is available in MT4 is SMT8. The hardware thread numbers that are available are 0-1 to the first logical partition, 2-3 to the second logical partition, 4-5 to the third logical partition, and 6-7 to the fourth logical partition. The virtual simultaneous multi-threading (vSMT) modes that are available while in four-way micro-threading mode are vSMT modes 1 and 2.

In one embodiment, the processor that is dynamically switched into various micro-threading modes is running a hypervisor such as a Kernel Virtual Machine (KVM). In this embodiment, host operating system 310 is executed by the processor with hypervisor 320 being run by the host operating system. In one embodiment, the operating system is a Linux® based operating system which runs a hypervisor utilizes various components to provide guest logical partitions 360. Linux® is the registered trademark of Linus Torvalds in the U.S. and other countries.

In one embodiment, hypervisor 320 is a Kernel Virtual Machine (KVM) for POWER, also known as PowerKVM™, which is a Linux-based hypervisor for IBM POWER8 machines. It utilizes a Linux® kernel running as the host operating system (OS). This Linux kernel runs in the processor's hypervisor mode and has access to all the facilities of the machine. It supports guest logical partitions through the facilities provided by the KVM module, which is a component of the Linux kernel. It provides a full OS environment, with a process scheduler, virtual memory management, file systems, network stacks, and device drivers, and supports execution of processes in user space.

PowerKVM includes two components which run as userspace processes: Quick Emulator Hardware Virtualization (QEMU) 350 and Platform Virtualization Management (libvirt) 340. To initiate a new guest logical partition, a file describing the characteristics of the new guest partition in XML format is created (GLP configuration file 330). This file contains details of the number of virtual CPUs, amount of memory, virtual and real I/O devices to be assigned to the guest partition, and the virtual SMT (vSMT) modes to utilize. A new guest is started by issuing a command to libvirt specifying the guest XML file. Libvirt then starts a QEMU process, which uses the facilities of the KVM module to create the guest and start it executing as a Guest Logical Partition (GLP) 360.

One of the details provided in the guest XML file 330 is the virtual SMT mode for the guest partition, that is, the number of guest virtual CPUs (vCPUs) in each virtual core (vCore). The virtual SMT (vSMT) mode can be specified to be 1, 2, 4 or 8, or left unspecified, in which case it is taken to be 1. The KVM module gives effect to the virtual SMT mode by ensuring that vCPUs in the same vcore always run together on a physical core when they are executing in the guest.

Figure 4:
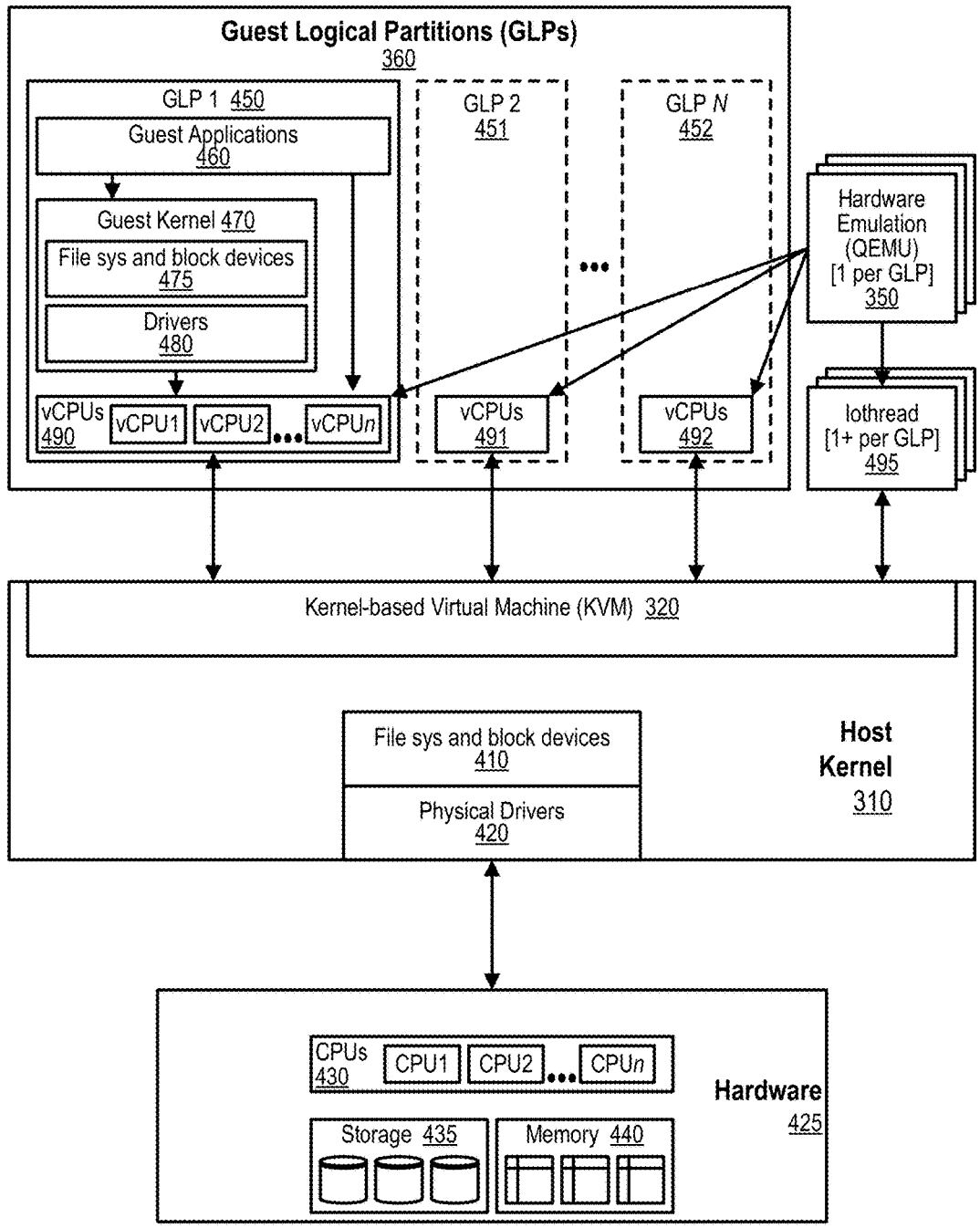
FIG. 4 is a component diagram depicting interactions between guest logical partitions, the host kernel, and the hardware.

FIG. 4 is a component diagram depicting interactions between guest logical partitions, the host kernel, and the hardware. Host kernel 310 runs the operating system, such as the Linux® operating system, under which hypervisor 320, such as the Kernel-based Virtual Machine™ (KVM) operates. Host kernel 310 also includes the file system and block devices 410 as well as physical device drivers 420 used to interact with the actual physical hardware 425, such as processors 430, storage 435, and memory 440.

The guest logical partitions (GLPs) that were shown being created in FIG. 3 are executed and managed using hypervisor 320. In FIG. 4, three GLPs are depicted (GLP 1 450, GLP 2 451, and GLP N 452). Details of GLP 1 450 are depicted while the other GLPs would have similar details. As shown in the detail of GLP 450, each GLP has one or more guest software applications 460 that run in the guest context. These guest applications utilize guest kernel 470 that generally includes an operating system, file system and block devices 475, and virtual device drivers 480 to utilize virtual devices such as virtual central processing units (vCPUs) 490. QEMU 350 hardware emulation 350 is provided for each GLP. In addition, one or more input/output threads (iothreads) 495 are provided for each GLP.

Figure 5:
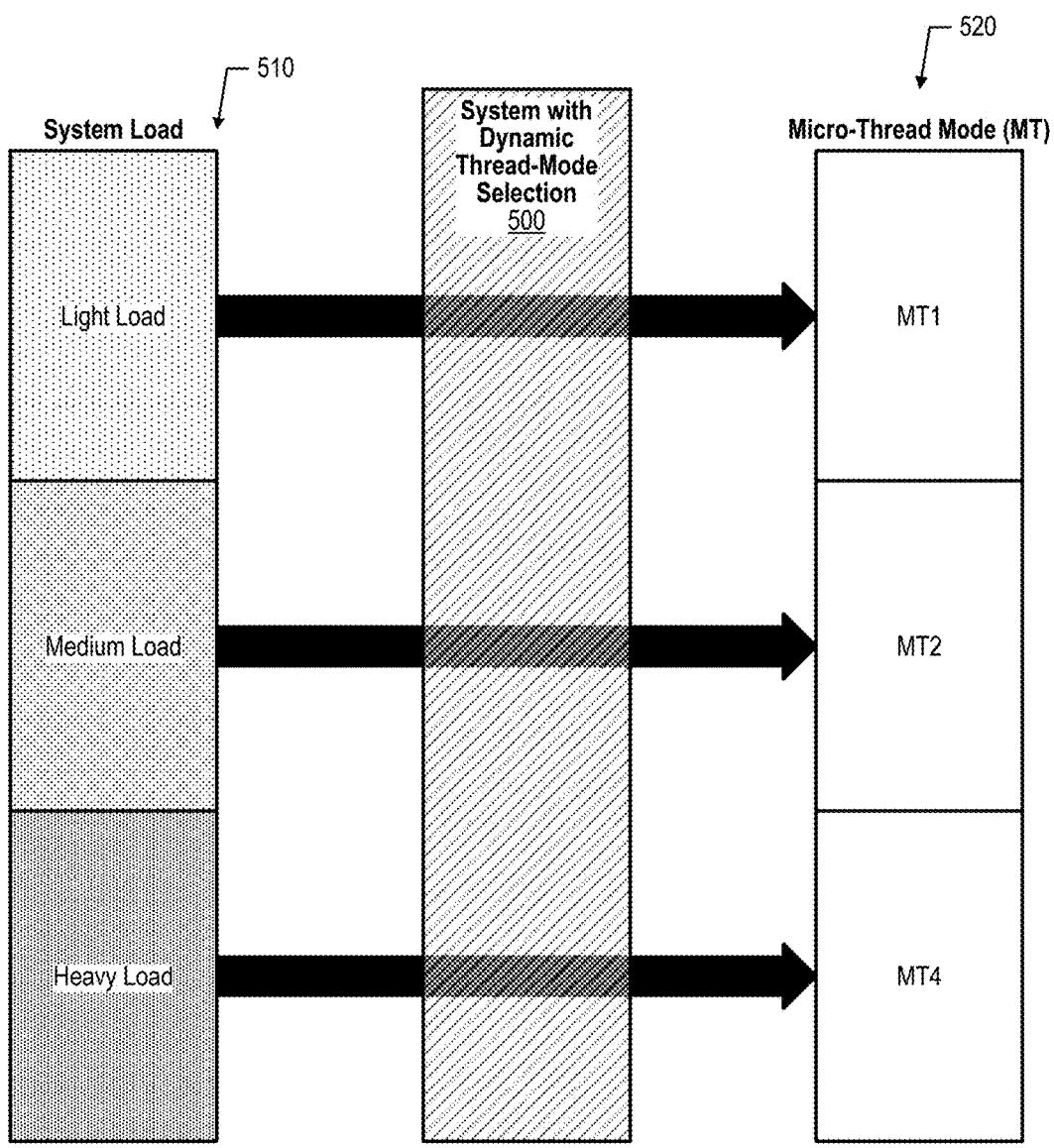
FIG. 5 is a diagram depicting a spectrum of system loads and a micro-thread mode that is dynamically selected.

FIG. 5 is a diagram depicting a spectrum of system loads and a micro-thread mode that is dynamically selected. System load 510 is depicted as varying from light to medium, to heavy. System 500, utilizing dynamic micro-thread mode selection, adjusts the micro-thread mode that is used on the processor based on the corresponding load. In this approach, the system chooses MT mode 520 for each core independently and dynamically according to the load on the system. When the system is lightly loaded, the processor cores will be in whole-core (MT1) mode. As the load increases and the opportunity arises, the system will automatically switch individual cores into MT2 or MT4 mode on entry to the guest, and then, when exiting from the guest context back to the host context, these cores will be switched back to whole-core (MT1) mode. As previously described with respect to FIG. 3, MT2 is also referred to as two-way micro-threading mode and MT4 is referred to as four-way micro-threading mode. See FIG. 3 for processor details related to the various micro-threading modes.

Figure 6:
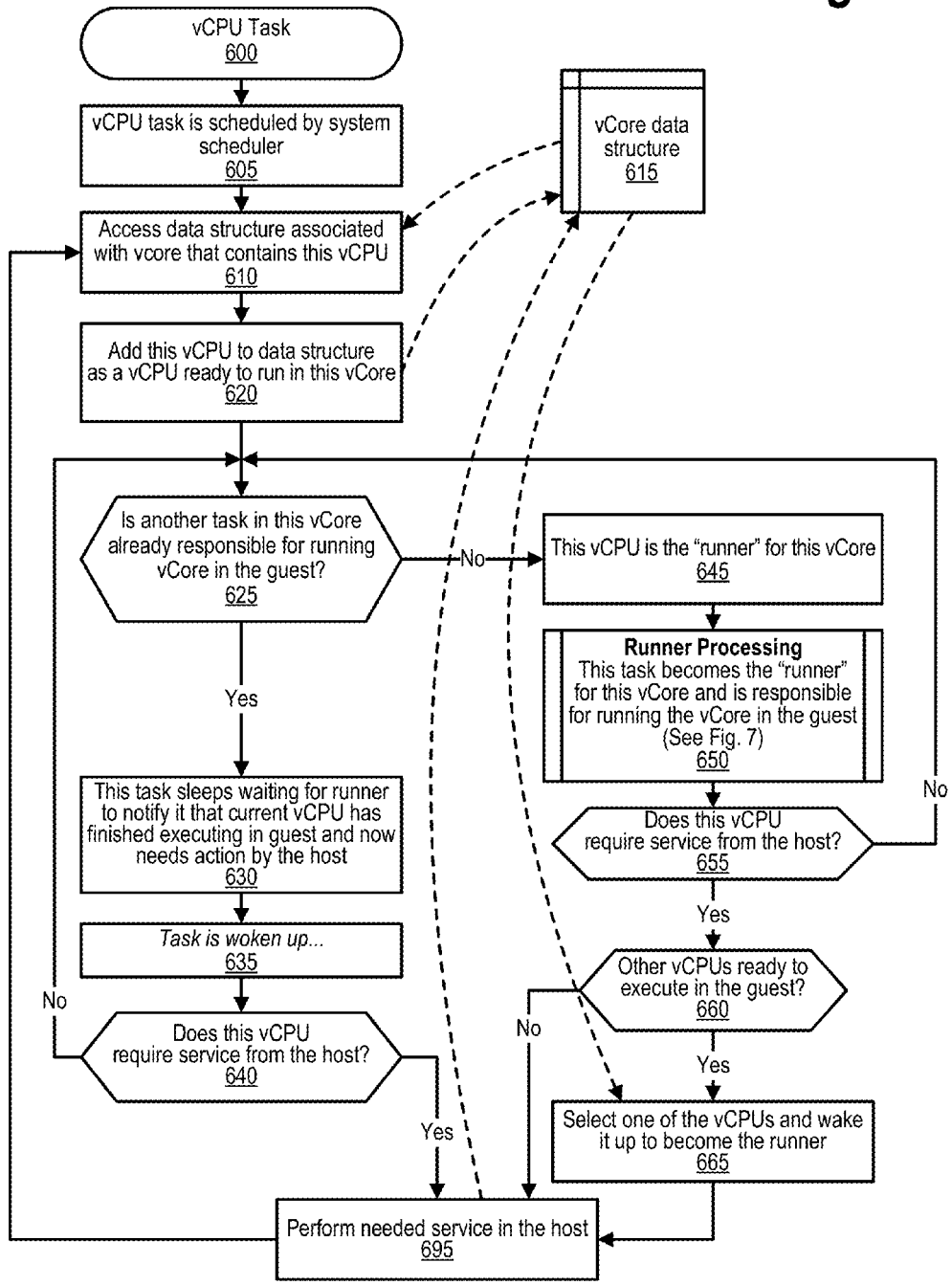
FIG. 6 is a flowchart depicting actions taken by a virtual CPU task.

FIG. 6 is a flowchart depicting actions taken by a virtual CPU task. FIG. 6 processing commences at 600 and shows the steps taken by a process that handles a virtual CPU (vCPU) task. At step 605, the vCPU's task is scheduled by the system scheduler. At step 610, the process accesses a data structure from memory area 615. The vCore data structure is associated with this virtual core (vCore) and contains an entry for this vCPU. At step 620, the process adds this vCPU to data structure 615 as being a vCPU that is ready to run in this vCore.

The process determines as to whether another task in this vCore is already responsible for running the vCore in the guest (decision 625). The task that is responsible for running the vCore in the guest is referred to as the "runner." If another task in this vCore is the runner, then decision 625 branches to the 'yes' branch to perform steps 630 through 640. On the other hand, if there is no runner task for this vCore, then decision 625 branches to the 'no' branch to perform steps 645 through 665. Taking the 'yes' branch from decision 625, at step 630, the process has this task sleep and wait for the runner to notify it that the current vCPU has finished executing in guest and now needs action by the host. At some future point, depicted by step 635, the task is woken up when the current runner has finished executing in the guest and needs action by the host. The process determines as to whether this vCPU requires service from the host (decision 640). If this vCPU requires service from the host, then decision 640 branches to the 'yes' branch whereupon, at step 695, the needed service is performed in the host. On the other hand, if this vCPU does not require service from the host, then decision 640 branches to the 'no' branch which loops back to re-perform decision 625 as described above. This looping may continue until this vCPU is selected as the "runner" for this vCore.

Figure 7:
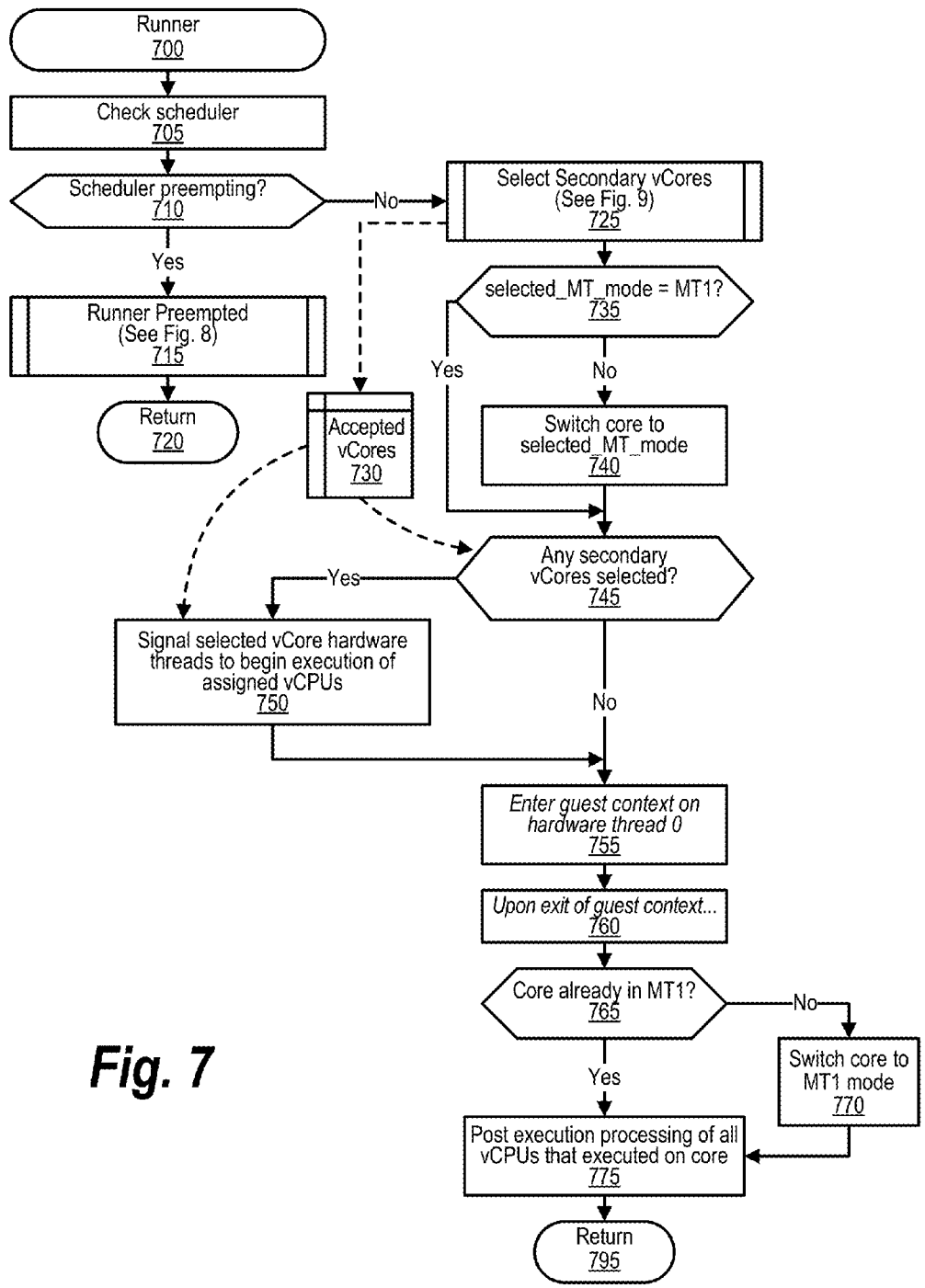
FIG. 7 is a flowchart depicting actions taken by a runner task.

Returning to decision 625 and taking the 'no' branch, at step 645, this vCPU is selected as the "runner" for this vCore. At predefined process 650, the process performs Runner Processing (see FIG. 7 and corresponding text for processing details). This task is now the "runner" for this vCore and is responsible for running the vCore in the guest routine as shown in FIG. 7 and other Figures. After runner processing has completed, the process determines as to whether this vCPU requires service from the host (decision 655). If this vCPU requires service from the host, then decision 655 branches to the 'yes' branch. On the other hand, if this vCPU does not require service from the host, then decision 655 branches to the 'no' branch which loops back to re-perform decision 625 as described above. If this vCPU requires service from the host, then the process determines whether other vCPUs are ready to execute in the guest (decision 660). If other vCPUs are ready to execute in the guest, then decision 660 branches to the 'yes' branch whereupon, at step 665, the process selects one of the other vCPUs and wakes it up to become the runner of this vCore. On the other hand, if no other vCPUs are ready to execute in the guest, then decision 660 branches to the 'no' branch bypassing step 665. At some point, service is needed to be performed by the host. Such service is depicted as being performed at step 695. After such service is performed, processing loops back to step 610 as described above.

FIG. 7 is a flowchart depicting actions taken by a runner task. FIG. 7 processing commences at 700 and shows the steps taken by a runner process that is responsible for running vCore in the guest context. At step 705, the process checks scheduler to see if the scheduler is preempting. The runner determines as to whether the scheduler is preempting the process (decision 710). If the scheduler preempting, then decision 710 branches to the 'yes' branch whereupon at predefined process 715, the process performs the Runner Preempted routine (see FIG. 8 and corresponding text for processing details) and processing returns to the calling routine at 720.

On the other hand, if the scheduler is not preempting, then decision 710 branches to the 'no' branch and the runner performs steps 725 through 795. At predefined process 725, the process performs the Select Secondary vCores routine (see FIG. 9 and corresponding text for processing details). vCores that are accepted by predefined process 725 are stored in memory area 730. At decision 735, the process determines as to whether the selected_MT_mode after running predefined process 725 is whole-core mode (MT1). If the selected_MT_mode is equal to MT1, then decision 735 branches to the 'yes' branch bypassing step 740. On the other hand, if the selected_MT_mode is not equal to MT1, then decision 735 branches to the 'no' branch whereupon, at step 740, the process switches the core's micro-threading mode to the selected_MT_mode that was selected in predefined process 725.

The process determines as to whether any secondary vCores were selected to run along with the runner process (decision 745). If any secondary vCores were selected, then decision 745 branches to the 'yes' branch whereupon, at step 750, the process signals the selected vCore hardware threads stored in memory area 730 to begin execution of assigned vCPUs. On the other hand, if no secondary vCores were selected by predefined process 725, then decision 745 branches to the 'no' branch bypassing step 750. At step 755, the process enters guest context on hardware thread 0 and executes the primary vCore (the runner process) and any selected secondary vCores in the guest context.

Upon exit of the guest context at step 760, the process determines as to whether the core is already in whole-core (MT1) mode (decision 765). If the core is already in MT1 mode, then decision 765 branches to the 'yes' branch bypassing step 770. On the other hand, if the core is not already in MT1 micro-threading mode, then decision 765 branches to the 'no' branch whereupon, at step 770, the process switches core back to MT1 mode. Because of the fact that only one logical partition can execute on each subcore, the host kernel is run in single-thread (ST) mode in whole-core (MT1) micro-threading mode. As the host kernel uses the memory management unit (MMU), it occupies one logical partition for itself. Running the host kernel in ST mode means that when a task wishes to enter the guest, it can do so immediately because all of the other threads in the subcore are idle. If the other threads were active, it would be necessary to interrupt them and get them to switch their context to the guest, which would add latency to the guest entry path. At step 775, the process performs post-execution processing of all vCPUs that executed on core. FIG. 7 processing thereafter returns to the calling routine (see FIG. 6) at 795.

Figure 8:
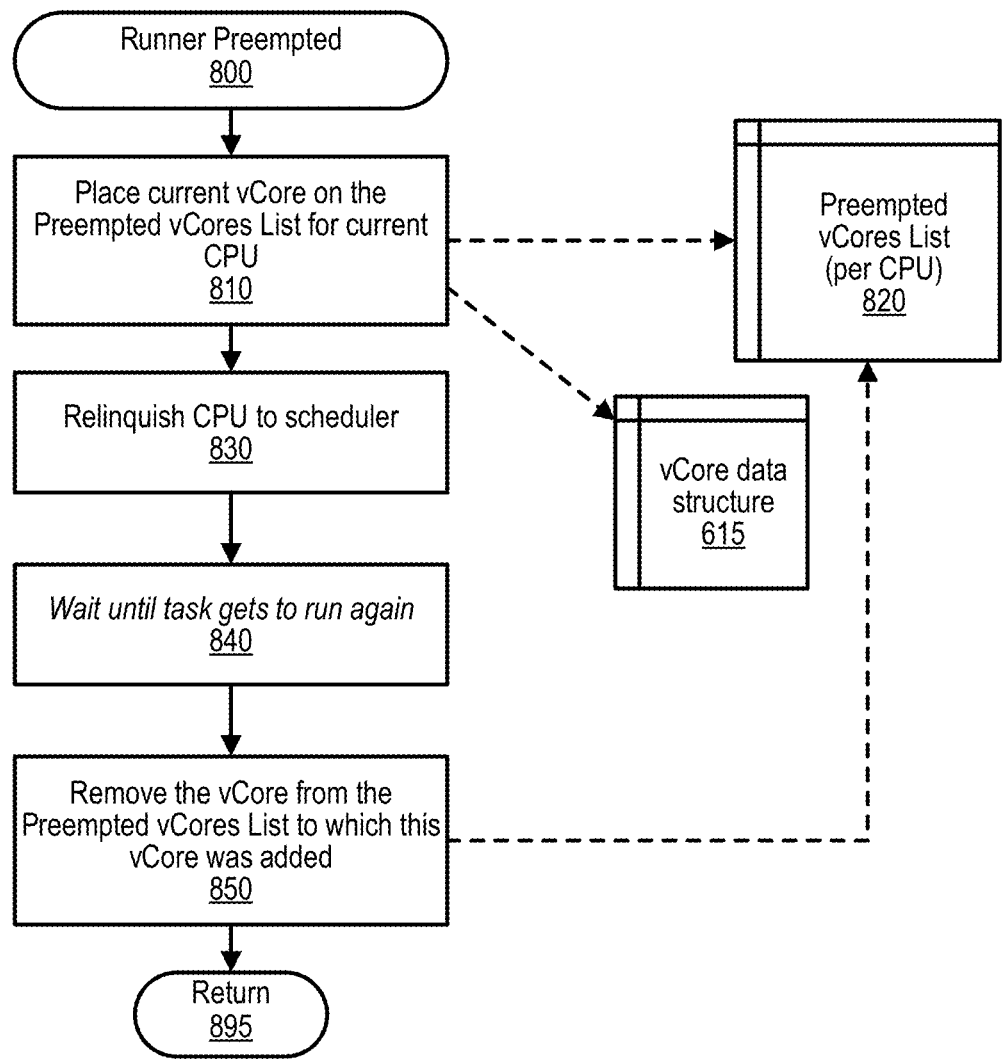
FIG. 8 is a flowchart depicting actions taken by the runner task when preempted by the scheduler.

FIG. 8 is a flowchart depicting actions taken by the runner task when preempted by the scheduler. FIG. 8 processing commences at 800 and shows the steps taken when the runner task is preempted. At step 810, the process places the current vCore on the Preempted vCores List for current CPU. Each CPU has a Preempted vCores List that is stored in memory area 820. In addition, the preemption of the current vCore is recorded in the vCore data structure that is stored in memory area 615. At step 830, the runner task relinquishes the CPU to scheduler. At step 840, the runner task waits until the task is able to run again, at which point, at step 850, the process removes the vCore from the Preempted vCores List to which this vCore was added in step 810. FIG. 8 processing thereafter returns to the calling routine (see FIG. 7) at 895.

Figure 9:
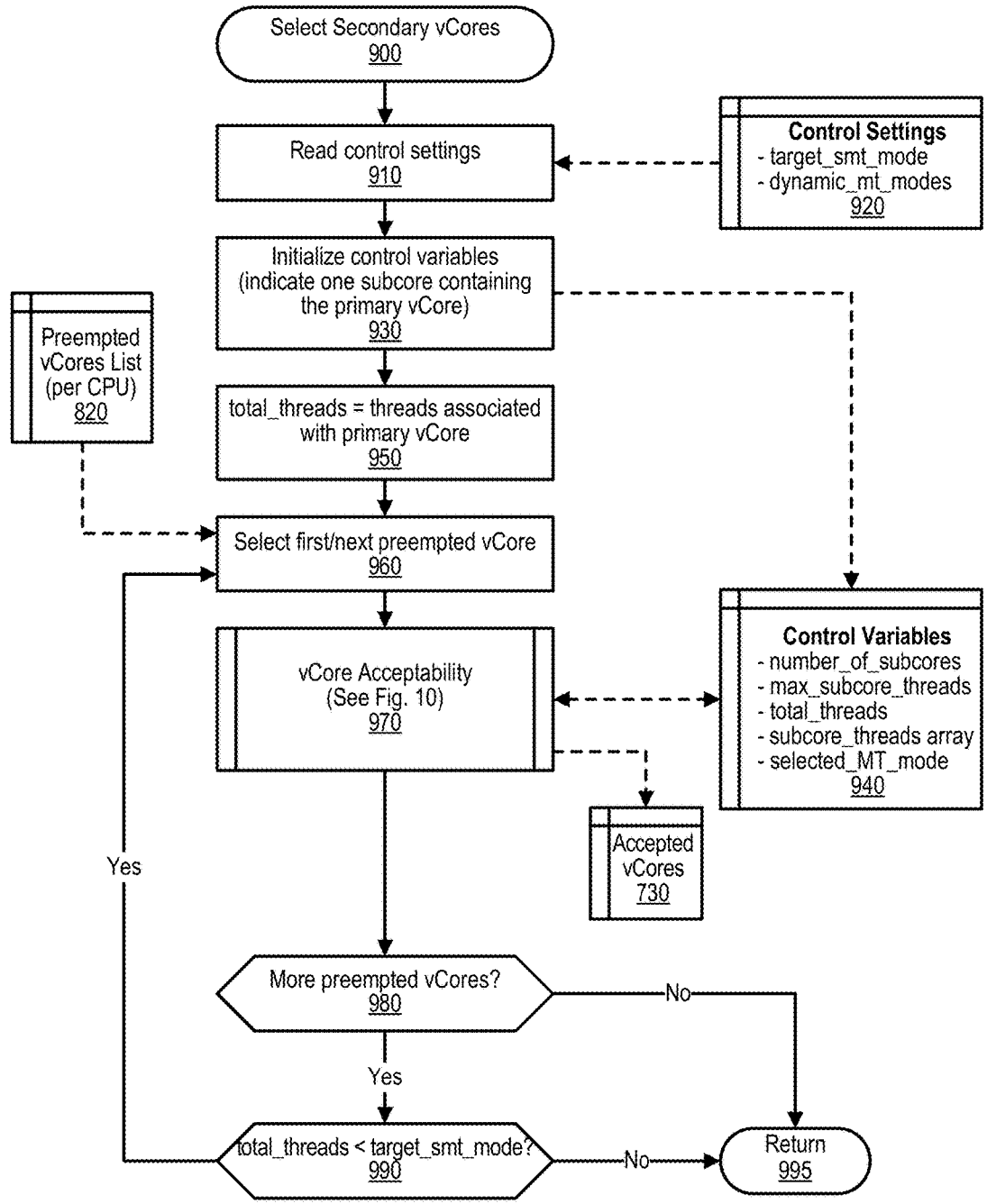
FIG. 9 is a flowchart depicting actions taken by the runner task when selecting secondary virtual cores.

FIG. 9 is a flowchart depicting actions taken by the runner task when selecting secondary virtual cores. FIG. 9 processing commences at 900 and shows the steps taken by a process that selects secondary vCores to run along with the primary vCore (the runner task). At step 910, the process reads control settings from memory area 920. These control settings are adjustable by the system administrator and include target_smt_mode that controls the total number of vCPU threads that the algorithm tries to get onto the core and dynamic_mt_modes that controls which of MT2 and/or MT4 micro-threading modes the algorithm will consider using (MT1 is assumed to be always allowed). At step 930, the process initializes the control variables. The initialization indicates one subcore that contains the primary vCore. The control variables are stored in memory area 940 and include variables number_of_subcores, max_subcore_threads, total_threads, subcore_threads array, and selected_mt_mode.

At step 950, the process initializes the total_threads variable to be the number of threads associated with primary vCore. At step 960, the process selects the first preempted vCore from memory area 820 that includes a list of the Preempted vCores for each CPU. At predefined process 970, the process performs the VCore Acceptability routine (see FIG. 10 and corresponding text for processing details). Secondary vCores that are accepted are stored in memory area 730. After processing the selected preempted vCore, the process determines whether there are more preempted vCores to process (decision 980). If more preempted vCores, then decision 980 branches to the 'yes' branch. On the other hand, if there are no more preempted vCores to process, then decision 980 branches to the 'no' branch whereupon processing returns to the calling routine (see FIG. 7) at 995.

If there are more preempted vCores to process, then the process next determines whether the total_threads variable is a value less than the threads allowed by the target_smt_mode control setting (decision 990). If the total_threads variable is a value less than the threads allowed by the target_smt_mode control setting (indicated more threads can be added), then decision 990 branches to the 'yes' branch which loops back to select and process the next preempted vCore from memory area 820 as described above. On the other hand, if no more threads can be added based on the target_smt_mode, then decision 990 branches to the 'no' branch and processing returns to the calling routine (see FIG. 7) at 995.

Figure 10:
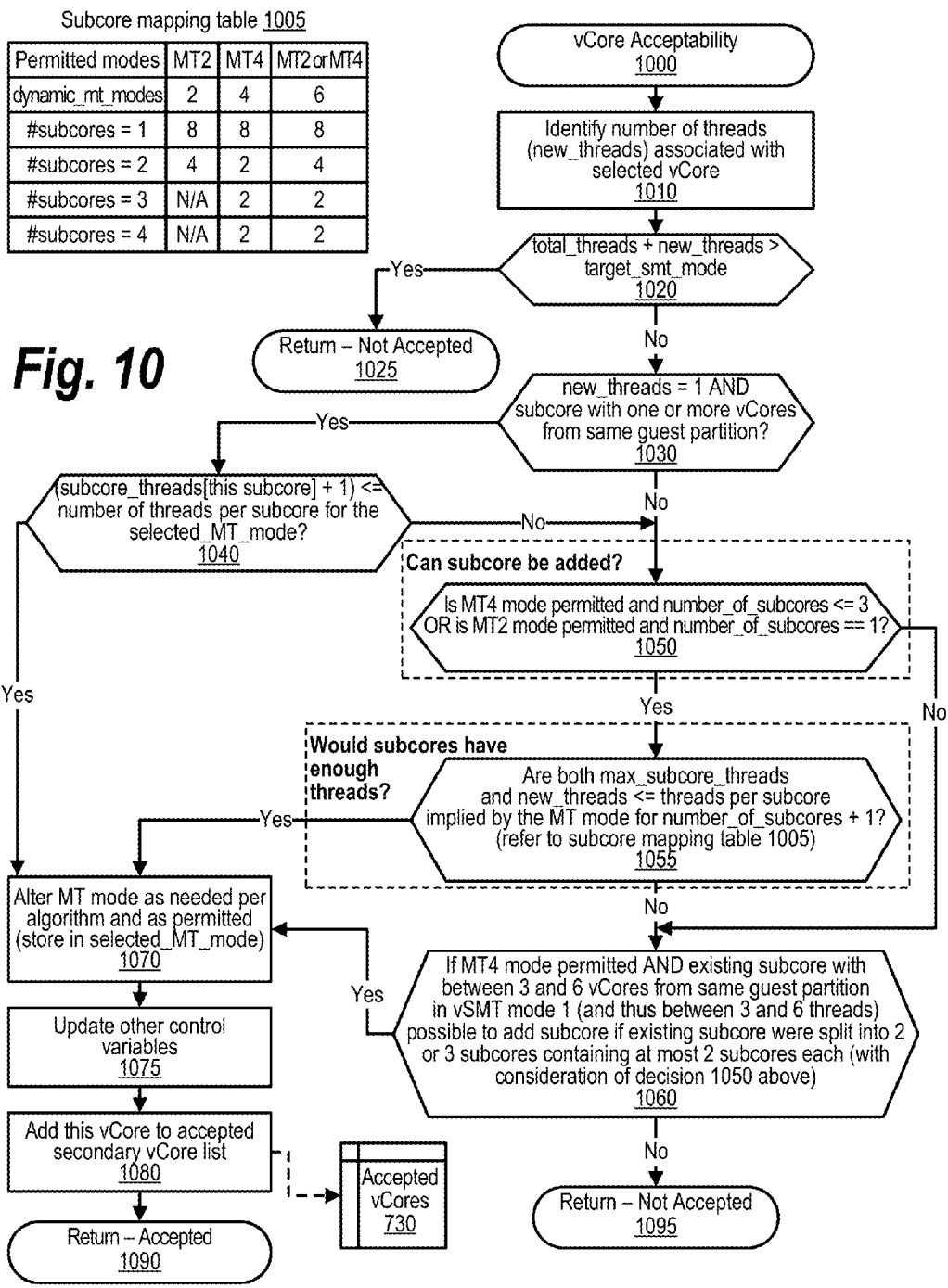
FIG. 10 is a flowchart depicting actions taken to ascertain acceptable secondary virtual cores to run concurrently with the runner task.

FIG. 10 is a flowchart depicting actions taken to ascertain acceptable secondary virtual cores to run concurrently with the runner task. FIG. 10 processing commences at 1000 and shows the steps taken by a process that determines vCore Acceptability (whether the vCore can be run along with the primary vCore). At step 1010, the process identifies number of threads (new_threads) that are associated with selected vCore. The process determines as to whether the total number of threads would exceed the number of allowed threads if this vCore was accepted (decision 1020). If the total number of threads would exceed the number of allowed threads if this vCore was accepted, then decision 1020 branches to the 'yes' branch whereupon processing returns to the calling routine (see FIG. 9) with an indication that this vCore is not accepted at 1025.

On the other hand, if the total number of threads would not exceed the number of allowed threads if this vCore was accepted, then decision 1020 branches to the 'no' branch for further processing. The process determines as to whether the number of threads from this vCore (i.e. new_threads) is equal to one and there is already a subcore containing one or more vCores from the same guest partition as this vCore (decision 1030). If this condition is true, then decision 1030 branches to the 'yes' branch to process decision 1040. On the other hand, if this condition is false, then decision 1030 branches to the 'no' branch to perform decision 1050. At decision 1040, the process determines as to whether adding one thread to the number of threads on this subcore would exceed the number of threads allowed for the selected_MT_mode. If another thread can be added, then decision 1040 branches to the 'yes' branch to perform steps 1070 through 1080 that accept this vCore. On the other hand, if another thread cannot be added for the selected_MT_mode, then decision 1040 branches to the 'no' branch for further processing starting at decision 1050.

At decision 1050, the process determines whether another subcore can be added. If another subcore can be added, then decision 1050 branches to the 'yes' branch to perform steps 1070 through 1080 that accept this vCore. On the other hand, if another subcore cannot be readily added, then decision 1050 branches to the 'no' branch to perform decision 1055.

At decision 1055, the process determines as to whether the subcores can add the additional threads. Subcore mapping table 1005 shows data utilized in performing this determination. If the subcores can add the additional threads, then decision 1055 branches to the 'yes' branch to perform steps 1070 through 1080 that accept this vCore. On the other hand, if the subcores cannot add the additional threads, then decision 1055 branches to the 'no' branch for additional processing shown in decision 1060.

At decision 1060, the process determines whether it is possible to add an additional subcore if an existing subcore were split into two or three subcores containing at most two subcores each. If it is possible to add an additional subcore if an existing subcore were split into two or three subcores containing at most two subcores each, then decision 1060 branches to the 'yes' branch to perform steps 1070 through 1080 that accept this vCore. On the other hand, if it is not possible to add an additional subcore if an existing subcore were split into two or three subcores containing at most two threads each, then decision 1060 branches to the 'no' branch whereupon processing returns to the calling routine (see FIG. 9) at 1095.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:
1. An information handling system comprising:
one or more processors, wherein at least a selected one of the processors includes a plurality of cores that are able to execute in a plurality of micro-threading (MT) modes;
one or more data stores accessible by at least one of the processors;
a memory coupled to at least one of the processors; and
a set of computer program instructions stored in the memory and executed by at least one of the processors in order to select the micro-threading (MT) mode of each core of the selected processor based on a load on each of the respective cores while the selected processor is running a hypervisor, wherein the MT mode is selected by performing actions comprising:
dynamically setting a selected core's micro-threading mode to a whole-core mode (MT1) in response to identifying that the load on the selected core is at a first load level;
dynamically setting the selected core's micro-threading mode to a two-way micro-threading mode (MT2) in response to identifying that the load on the selected core has increased above the first load level to a second load level;
dynamically setting the selected core's micro-threading mode to a four-way micro-threading mode (MT4) in response to identifying that the load on the selected core has increased above the second load level to a third load level;

entering a quest context after the setting of the micro-threading mode; and switching the micro-threading mode of the selected core to the whole-core mode (MT1) upon the selected core exiting from the guest context.

2. The information handling system of claim 1 wherein the actions further comprise:

selecting a primary virtual core to execute on the selected core;

scanning a plurality of preempted virtual cores; and selecting one or more of the preempted virtual cores to execute as secondary virtual cores along with the primary virtual core.

3. The information handling system of claim 2 wherein the actions further comprise:

selecting the micro-threading mode based on the selection of the secondary virtual cores.

4. The information handling system of claim 3 wherein the actions further comprise:

in response to a task executing on the primary virtual core requiring a service from a host process:

placing the task on a preempted virtual cores list corresponding to a current CPU; and selecting a different task to execute on the primary virtual core.

5. The information handling system of claim 4 wherein the actions further comprise:

performing the service by the host process on the task; and removing the task from the preempted virtual cores list.

6. The information handling system of claim 3 wherein the actions further comprise:

performing any needed service in a host process in response to exiting from the guest context; and for each virtual CPU (vCPU) task scheduled to execute on the selected virtual core:

add an entry to a vCore data structure pertaining to each vCPU task that is ready to execute on the selected virtual core;

selecting one of the vCPU tasks as the runner task for the selected virtual core, wherein the runner task executes on the primary virtual core; and selecting one or more of the vCPU tasks as tasks to execute concurrently with the runner task on the selected virtual core.

7. A computer program product stored in a computer readable storage medium, comprising computer program code that, when executed by an information handling system, selects the micro-threading (MT) mode of each core of a processor based on a load on each of the respective cores while the selected processor is running a hypervisor, wherein the MT mode is selected by performing actions comprising:

dynamically setting a selected core's micro-threading mode to a whole-core mode (MT1) in response to identifying that the load on the selected core is at a first load level;

dynamically setting the selected core's micro-threading mode to a two-way micro-threading mode (MT2) in response to identifying that the load on the selected core has increased above the first load level to a second load level;

dynamically setting the selected core's micro-threading mode to a four-way micro-threading mode (MT4) in response to identifying that the load on the selected core has increased above the second load level to a third load level;

entering a quest context after the setting of the micro-threading mode; and switching the micro-threading mode of the selected core to the whole-core mode (MT1) upon the selected core exiting from the guest context.

8. The computer program product of claim 7 wherein the actions further comprise:

selecting a primary virtual core to execute on the selected core;

scanning a plurality of preempted virtual cores; and selecting one or more of the preempted virtual cores to execute as secondary virtual cores along with the primary virtual core.

9. The computer program product of claim 8 wherein the actions further comprise:

selecting the micro-threading mode based on the selection of the secondary virtual cores.

10. The computer program product of claim 9 wherein the actions further comprise:

in response to a task executing on the primary virtual core requiring a service from a host process:

placing the task on a preempted virtual cores list corresponding to a current CPU; and selecting a different task to execute on the primary virtual core.

11. The computer program product of claim 10 wherein the actions further comprise:

performing the service by the host process on the task; and removing the task from the preempted virtual cores list.

* * * * *